United States Patent [19]

Cottrell, Jr. et al.

[11] 4,144,305

[45] Mar. 13, 1979

[54] METHOD OF OBTAINING INTERFACE ADHESION BETWEEN THERMOSETTING LAYERS WHICH CONTAIN MOLD RELEASE AGENTS

[75] Inventors: Walter D. Cottrell, Jr., Newark; Ralph B. Jutte, Jr., Granville, both of Ohio

[73] Assignee: Owens-Corning Fiberglas Corporation, Toledo, Ohio

[21] Appl. No.: 710,979

[22] Filed: Aug. 2, 1976

Related U.S. Application Data

[63] Continuation of Ser. No. 558,405, Mar. 14, 1975, abandoned.

[51] Int. Cl.² .......................... B29C 9/00; B29C 6/02; B29D 9/00
[52] U.S. Cl. .................................. 264/247; 156/245; 264/251; 264/254; 264/255; 264/260; 264/275; 264/300; 428/420; 428/482; 428/483

[58] Field of Search .............. 264/246, 247, 255, 300, 264/338, 251, 260, 254, 275; 156/245, 242; 428/420, 482, 483, 502

[56] References Cited

U.S. PATENT DOCUMENTS

| | | | |
|---|---|---|---|
| 3,247,046 | 4/1966 | Fazekas | 156/245 |
| 3,549,477 | 12/1970 | Burgman | 156/245 |
| 3,784,664 | 1/1974 | Nicklin | 264/246 |
| 3,801,693 | 4/1974 | Stallings et al. | 264/246 |
| 3,812,074 | 5/1974 | Oswitch et al. | 264/255 |

*Primary Examiner*—James B. Lowe
*Attorney, Agent, or Firm*—Ronald C. Hudgens; Philip R. Cloutier

[57] ABSTRACT

Disclosed is a method of bonding two layers of thermosetting plastic. A thin sheet of thermoplastic material is interpositioned between two layers of thermosetting plastic and the combination is subjected to temperatures sufficient to cause the thermosetting plastic layers to bond and cure. The thermosetting plastic contains mold release agents which are absorbable by the thermoplastic sheet, and crosslinking monomers in which the thermoplastic sheet is dissolvable at molding temperatures.

15 Claims, No Drawings

METHOD OF OBTAINING INTERFACE ADHESION BETWEEN THERMOSETTING LAYERS WHICH CONTAIN MOLD RELEASE AGENTS

This is a continuation, of application Ser. No. 558,405, filed Mar. 14, 1975, now abandoned.

BACKGROUND OF THE INVENTION

The molding compounds with which we are concerned utilize a crosslinking thermosetting polymer as a matrix material and may include fillers and/or fibers to strengthen and/or cheapen the product. The molding compounds usually include an activating catalyst for the crosslinking process, and a mold release agent which prevents these materials from bonding to the metal dies used in the molding process. Great economy is achieved by reason of the simultaneous shaping and curing of the molding compounds to a thermoset condition. Molding compounds are dependent, however, upon the presence of a mold release agent to prevent the crosslinking of the molding compound from adhering to the surfaces of the forming molds. The precise mechanism by which mold release agents operate is not known. One theory which has been held heretofore is that there is a migration during cure of the mold release agent to the heated surface of the mold to create a nonadhering film on the surface of the molded part produced. Whether or not this theory is correct, has to the writer's knowledge, never been settled. It is axiomatic, however, that without the presence of the mold release agent, molding compounds stick tenaciously to the surface of untreated molds, and that with the mold release agent present, they do not stick to the surfaces of untreated molds. It is not always feasible to put lubricant on the surface of molds between the times that each part is made, so that molding compounds which are used for commercial production usually include a mold release agent, usually a salt of a fatty acid.

Certain problems exist with parts that are molded from compounds that contain mold release agents in that paints and/or subsequent pigmented resinous surfacing layers cannot be bonded thereto without the removal of the film of mold release agent that exists on the molded part. Removal of the film of mold release agent is usually done by sand blasting, sanding, scraping, etc.. A method used to produce colored parts without this removal step has been to incorporate pigment in the molding compound. The incorporation of the pigment in the molding compound, however, is wasteful of the pigment. Production of different pigmented molding compound is also more tedious.

An object of the present invention is the provision of a new and improved process whereby molding compounds containing mold release agents can be molded, and a highly pigmented coating applied thereto, without any additional preparation of the surface of the molded part before the coating is applied.

Another object of the invention is the provision of a new and improved process of the above-described type wherein the coating can be applied in the same set of dies in which the main body portion was molded.

Another object of the present invention is the provision of a new and improved method of bonding two separate layers of molding compounds even though they contain mold release agents.

Further objects and advantages of the invention will become apparent to those skilled in the art to which the invention relates from the following description of the preferred embodiments.

DESCRIPTION OF THE PREFERRED EMBODIMENTS

According to principles of the present invention, it has been discovered that it is possible to adhere a thin sheet of particular kinds of thermoplastic materials having certain particular properties to molding compounds even though they contain mold release agents. It has been discovered that the thermoplastic material must be dissolvable at molding temperatures by the solvents and particularly the crosslinking monomers that are used in the molding compound. The layer of thermoplastic material need be only a few mils thick, and surprisingly it has further been found that such a thin sheet can adhere a second body of molding compound having mold release agent therein to the first body of molding compound through the thermoplastic sheet. The resulting interfaces, of course, cannot be precisely analyzed. However, the strong bonding of applicants' thermoplastic sheets to the molding compounds seems to indicate that the molecules of monomers have in fact been utilized to adhere or bond the thermoplastic sheet to the crosslinked body of molding compound.

EXAMPLE 1

A polyester resin was made from the following materials in parts by weight:

| Materials | Parts By Weight |
| --- | --- |
| Propylene glycol | 578.2 |
| Maleic anhydride | 674.4 |
| Toluhydroquinone (25% solution in styrene) | 4.8 |

The polyester was made by charging all the propylene glycol, one third of the maleic anhydride and 1.6 grams of toluhydroquinone into a reactor using a continuous nitrogen sparge. The temperature was raised to 190° F., and after about 4 hours, the acid number was 35. Thereafter the remainder of the maleic anhydride was added at the rate of 100 to 150 parts per minute to control the temperature at 300° F. Thereafter the temperature of the ingredients was held at 310 to 320° F. for 60 minutes, following which the temperature was increased to 400° F. The material has an acid number of 29 to 32 and a sample cut 2 to 1 in styrene had a Saybold viscosity of 21 to 25 seconds at 350° F. Thereafter the contents were cooled to 340° F. The polyester prepolymer when cut with styrene in a 90 to 10 ratio was stable at 120° C. for 30 minutes before gelling.

In another tank 486.4 parts of styrene, 2.0 parts of MEHQ (methyl ether of hydroquinone) are mixed and held at a temperature between 130° to 145° F. Thereafter 1,138 parts of the polyester resin prepolymer produced as above described and at a temperature of 330° to 355° F. was added with agitation to provide a thinned polyester syrup which was then cooled to a temperature of 180° F. The viscosity of the thinned polyester syrup was 1,500 to 2,000 Brookfield cps and had a water content of 0.08 and a monomer content within the range of 30 to 34% by weight.

A resin-filler paste is made of the following materials:

| Materials | Desirable % By Wt. | Preferred % By Wt. |
|---|---|---|
| RESIN HAVING CROSSLINKABLE OLEFINIC DOUBLE BONDS | 25–95 | |
| Unsaturated resin syrup described above | | 42.7 |
| CATALYST FOR CROSSLINKING DOUBLE BONDS | 0.1–5 | |
| Dicumyl peroxide | | 0.85 |
| 2,5 - dimethyl hexyl-2,5-di (peroxybenzoate) | | 0.09 |
| MOLD RELEASE AGENT | 0–5 | |
| Zinc Stearate | | 1.71 |
| GELLING AGENT (Alkaline Earth Metal Oxide) | 0.2–10 | |
| Ca(OH)$_2$ | | 1.28 |
| SOLVENT | Optional | |
| Styrene monomer | | 4.27 |
| FILLERS | 0–75 | |
| Resin type (microethylene) | | 6.4 |
| Nonresinous filler (CaCO$_3$) | | 43.7 |

The following mix procedure is used to make the resin-filler paste. The resin-filler paste is prepared by charging the resin to a Cowles type mixture. The 2,5-dimethyl hexyl-2,5-di(peroxybenzoate) dissolved in approximately half of the styrene is blended with the resin. Thereafter, the dicumyl peroxide and mold release agent are added. The resin type filler is then blended in, following which the nonresinous filler is likewise added and thoroughly dispersed. Immediately before the resin-filler paste is to be used, a slurry of the gelling agent in the other half of the styrene is added and mixed for approximately three minutes.

After aging for one week, a molded part approximately 0.100 inch thick was made using a male and female steel die set which was heated to 300° F. The female mold had a flat cavity 12 × 18 by 1 inch deep. Sufficient of the above molding compound was placed in the mold cavity to form a part 0.090 inch thick. A methylmethacrylate sheet 2 mils thick was placed on top of the molding compound, and the male die was brought down into engagement therewith with a force of 1,000 lbs. per square inch, and was held at this pressure and temperature for 90 seconds. Thereafter the male die was raised to separate from the composite, and sufficient colored polyester molding compound was placed on top of the methylmethacrylate layer to form an additional thickness of 0.008 inch. The colored molding compound was obtained by mixing 1% by weight of carbon black with the molding compound described above. The male die was then brought down against the colored polyester layer with a force of 1,000 lbs. per square inch and this force was again held for 30 seconds. The male die was then raised and the composite removed from the mold and cooled. The top black layer could not be peeled from the base layer without destroying the composite.

EXAMPLE 2

The process of Example 1 was repeated excepting that the polymethacrylate film was replaced with a sheet of polystyrene. The composite so produced had substantially the same properties as did the composite of Example 1.

EXAMPLE 3

The process of Example 1 was repeated excepting that the polymethacrylate film was replaced with a sheet of polyvinylacetate. This composite so produced had substantially the same properties as the composite of Example 1.

EXAMPLE 4

The process of Example 1 was repeated excepting that a commercial colored gel coat having a catalyst, a thickening agent, and zinc stearate mold release agent added thereto was used in place of the colored polyester layer. The gel coat is tightly bonded to the base layer through the thermoplastic sheet.

EXAMPLE 5

A sheet molding compound is made using the resin filler paste, a carrier film of polyethylene and another carrier film of polyethylmethacrylate. These materials are processed according to the procedure taught in Davis, et al. U.S. Pat. No. 3,615,979, and is stored to produce the sheet molding compound. This sheet molding compound can be used in the molding procedure of Example 1 by removing the polyethylene carrier film, and substituting the remainder of the sheet molding compound for the molding compound and thermoplastic sheet of Example 1.

EXAMPLE 6

A molded article in which a highly pigmented and/or filled layer having one rate of cure shrinkage can be bonded to a thermoset resin preferably reinforced with glass fibers and having a different cure shrinkage rate by means of the present invention. For example, the gel coat of Example 4 is applied to the polyethylmethacrylate carrier film of the sheet molding compound of Example 5. The gel coat is allowed to thicken to a non-running condition, the polyethylene carrier film is removed from the sheet molding compound and the resulting sandwich is then placed in the mold and cured according to the procedure of Example 1. The gel coat is tightly bonded to the glass fiber reinforced base layer through the intermediary of the thermoplastic sheet in a manner accommodating the differences in cure shrinkage of the gel coat and base layers.

The following thermoplastics which are softened by and permeable to styrene are the preferred thermoplastics for the bonding function of the present invention: polystyrene, substituted polystyrene, polyalkylacrylates, substituted polyalkylacrylates, polyvinylacetate and substituted polyvinylacetate.

It will now be seen that the sheets of thermoplastic material which are softenable by and permeable to the crosslinking solvents under the conditions of heat, etc. which exists in the molding operation can be used. Styrene is a preferred solvent since it is believed to permeate the plastic sheet and then polymerize in situ and crosslink with the polyester resin layers. When desired, parts can be made with a single molding operation by placing the sheet of thermoplastic material between two layers of sheet molding compound to form an uncured sandwich. Thereafter the sandwich can be compressed by the heated mold surface to cure and bond the two layers of molding compound through the thermoplastic layer.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. In the method of producing molded plastic parts wherein first and second thermosetting resin layers are positioned between male and female dies and shaped, bonded and cured under applied pressure and heat, the improvement comprising: superimposing a first layer of moldable thermosetting material which contains a mold release agent and a crosslinking monomer against one side of a sheet of thermoplastic polymeric material the polymer of which absorbs said mold release agent when heated, placing a second layer of moldable thermosetting material which contains a crosslinking monomer, and a mold release agent that is absorbable by said thermoplastic polymer against the other side of said thermoplastic sheet to form a composite, said sheet of thermoplastic polymer being but a few mils thick, and being dissolvable at molding temperatures by said cross linking monomers, compressing the composite to force the three materials into intimate contact, and curing the thermosetting layers by the application of heat while the layers are in intimate contact with the thermoplastic material, thereby adhering the cured second layer of thermosetting material to the first layer of cured thermosetting material by means of said sheet of thermoplastic material.

2. The method of claim 1 wherein said first and second layers of moldable material are crosslinkable polyester molding compounds.

3. The method of claim 2 wherein said first and second layers of moldable material contain a styrene monomeric solvent and said sheet of thermoplastic is a material which is soluble in styrene.

4. The method of claim 3 wherein said sheet of thermoplastic material is a polymer selected from the group consisting of polystyrene, substituted polystyrene, polyalkylacrylate, substituted polyalkylacrylate, polyvinylacetate and substituted polyvinylacetate base materials.

5. The method of claim 4 wherein said mold release agents are salts of fatty acids.

6. In the method of producing molded plastic parts wherein first and second thermosetting resin layers are positioned between male and female dies and shaped, bonded and cured under applied pressure and heat, the improvement comprising: superimposing a first layer of moldable thermosetting material which contains a mold release agent and a crosslinking monomer on a sheet of thermoplastic polymeric material the polymer of which absorbs said mold release agent when heated, pressing the layers together to shape the layers, placing a second layer of moldable thermosetting material which contains a crosslinking monomer, and a mold release agent that is absorbable by said thermoplastic polymer against said thermoplastic sheet to shape said second layer and form a composite, said sheet of thermoplastic polymer being but a few mils thick, and being dissolvable at molding temperatures by said crosslinking monomers, compressing the composite between heated surfaces to force the three materials into intimate contact and simultaneously cure and adhere the second moldable material to the first layer of moldable material through the intermediary of said sheet of thermoplastic material.

7. In the process of producing molded parts from sheet molding compounds containing materials effective to achieve a release of the molded parts from confining molding surfaces, wherein first and second thermosetting resin layers are positioned between male and female dies and shaped, bonded and cured under applied pressure and heat, the improvement comprising: placing a first layer of crosslinkable molding compound containing a crosslinking solvent and a mold release agent against one side of a sheet of a polymer which is dissolvable by said solvent and which is miscible with the mold release agent, placing a second layer of crosslinkable molding compound containing a crosslinking solvent and a mold release agent against the other side of the polymeric sheet to form a composite, said sheet being but a few mils thick and compressing the composite between molding surfaces at least one of which is heated to soften the sheet of polymer to where it absorbs said mold release agent and bonds said first and second layers of molding compound together through said sheet of polymer.

8. The process of claim 7 wherein said thermoplastic polymer is from the group consisting of polystyrene, substituted polystyrene, polyacrylate, substituted polyacrylate, polyvinylacetate, and substituted polyvinylacetate base materials.

9. The process of claim 8 wherein said mold release agents are salts of fatty acids, and said solvent is styrene.

10. The process of claim 9 wherein said molding compounds are polyester base materials.

11. In the process of producing molded parts from sheet molding compounds containing materials effective to achieve a release of the molded parts from confining molding surfaces wherein first and second thermosetting resin layers are positioned between male and female dies and shaped, bonded and cured under applied pressure and heat, the improvement comprising: placing a first layer of crosslinkable molding compound containing a crosslinking solvent and a mold release agent against a sheet of a polymer which is dissolvable by said solvent and in which said mold release agent is miscible, compressing the first layer of molding compound and polymeric sheet together between molding surfaces to form a preform, placing a second layer of crosslinkable molding compound containing a crosslinking solvent and mold release agent on the polymeric sheet of the preform to form a composite, said sheet being but a few mils thick and compressing the composite between molding surfaces at least one of which is heated to soften the sheet of polymer to where it absorbs said mold release agent and bonds said first and second layers of molding compound together.

12. The process of claim 11 wherein said first layer of moldable compound is a polyester base sheet molding compound and said second layer of molable compound is a highly pigmented gel coat.

13. The process of claim 11 wherein said thermoplastic polymer is from the group consisting of polystyrene, substituted polystyrene, polyacrylates, substituted polyacrylates, polyvinylacetate, and substituted polyvinylacetate.

14. The process of claim 11 wherein the molding surfaces which form the preform are heated to at least partially bond the first layer of molding compound to said polymeric sheet before combining the preform with said second layer of molding compound to form the composite.

15. A method of bonding a highly pigmented and filled layer of thermosetting material to a layer of thermosetting material containing glass fiber reinforcement, said method comprising: preparing a first moldable mixture of a thermosetting material, a crosslinking solvent therefor, mold release agent, filler and pigment; preparing a second moldable mixture of thermosetting material, a crosslinking solvent therefor and glass fiber reinforcement; preparing a sandwich of a thermoplastic sheet which is softened by said crosslinking solvents, and said moldable mixtures with a layer of said first mixture positioned against one surface of said sheet and a layer of said second mixture positioned against the other surface of said sheet; said thermoplastic sheet being but a few mils thick, placing the surface of said sandwich formed by said first mixture against a heated surface; and applying pressure against the opposite surface of said sandwich to simultaneously compress, shape, and cure said sandwich against said heated surface.

* * * * *